(12) United States Patent
Dutsky et al.

(10) Patent No.: US 9,415,802 B2
(45) Date of Patent: Aug. 16, 2016

(54) UNIVERSAL CARTRIDGE TORQUE OVERLAY ASSEMBLY

(71) Applicant: STEERING SOLUTIONS IP HOLDING CORPORATION, Saginaw, MI (US)

(72) Inventors: Jason A. Dutsky, Bay City, MI (US); Joel E. Birsching, Vassar, MI (US); Martin P. Sheridan, Midland, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/459,468

(22) Filed: Aug. 14, 2014

(65) Prior Publication Data

US 2015/0047919 A1     Feb. 19, 2015

Related U.S. Application Data

(60) Provisional application No. 61/866,111, filed on Aug. 15, 2013.

(51) Int. Cl.

| | |
|---|---|
| *B62D 5/06* | (2006.01) |
| *B62D 5/065* | (2006.01) |
| *B62D 5/09* | (2006.01) |
| *B62D 5/083* | (2006.01) |

(52) U.S. Cl.
CPC .............. *B62D 5/065* (2013.01); *B62D 5/0835* (2013.01); *B62D 5/09* (2013.01); *B62D 5/06* (2013.01); *B62D 5/083* (2013.01); *B62D 5/0832* (2013.01)

(58) Field of Classification Search
CPC ........ B62D 5/06; B62D 5/083; B62D 5/0832; B62D 5/14
USPC .................................. 180/421, 422
See application file for complete search history.

(56) References Cited

U.S. PATENT DOCUMENTS

| | | | | |
|---|---|---|---|---|
| 4,474,256 | A | * 10/1984 | Bacardit | 180/429 |
| 4,475,615 | A | 10/1984 | Stanek | |
| 5,119,898 | A | * 6/1992 | Eckhardt et al. | 180/422 |
| 5,738,182 | A | * 4/1998 | Birsching et al. | 180/422 |
| 5,749,432 | A | * 5/1998 | Birsching | 180/443 |
| 7,434,654 | B2 | 10/2008 | Birsching et al. | |
| 7,898,139 | B2 | 3/2011 | Islam et al. | |
| 8,170,751 | B2 | 5/2012 | Lee et al. | |

(Continued)

FOREIGN PATENT DOCUMENTS

| | | |
|---|---|---|
| CN | 1199685 A | 11/1998 |
| CN | 1857955 A | 11/2006 |

(Continued)

OTHER PUBLICATIONS

Chinese Office Action for Application No. CN201410605631.6 dated Apr. 29, 2016.

*Primary Examiner* — Joseph Rocca
*Assistant Examiner* — Marlon Arce
(74) *Attorney, Agent, or Firm* — Cantor Colburn LLP

(57) ABSTRACT

In one aspect of the invention, a power steering assist system is provided. The system includes a housing, an actuator assembly, a rotary valve assembly, a bearing assembly, a differential pressure transducer, and a coupler. The coupler includes a first end and a free second end, the free second end extending from the housing and configured to couple to a component of a steering gear system.

14 Claims, 3 Drawing Sheets

(56) References Cited

U.S. PATENT DOCUMENTS

2006/0249326 A1 11/2006 Birsching et al.
2009/0050398 A1 2/2009 Islam et al.

FOREIGN PATENT DOCUMENTS

| CN | 202063182 U | 12/2011 |
|---|---|---|
| EP | 2221237 B1 | 8/2010 |

* cited by examiner

US 9,415,802 B2

UNIVERSAL CARTRIDGE TORQUE OVERLAY ASSEMBLY

CROSS-REFERENCES TO RELATED APPLICATIONS

This patent application claims priority to U.S. Provisional Patent Application Ser. No. 61/866,111, filed Aug. 15, 2013, which is incorporated herein by reference in its entirety.

FIELD OF THE INVENTION

The following description relates to a vehicle steering system, and more particularly, to a universal steering assist system for connecting to a hydraulic steering gear.

BACKGROUND OF THE INVENTION

In some vehicles, power steering systems are designed to provide hydraulic assist to enable a driver to complete a turn of the vehicle. For example, the driver applies a steering input through a steering wheel that is rotationally connected to a first shaft. The first shaft is rotationally coupled to a second shaft that is, in turn, connected to a steering mechanism. The first and second shafts are torque transmittingly coupled together by a compliant member, such as a torsion bar, which enables the first shaft to rotate with respect to the second shaft.

Some known hydraulic steering systems use a recirculating ball style steering gear or a rack and pinion style steering gear, each of which may not have the capability to perform functions such as park assist, lane keeping, lead and pull compensation, drive alert, active return-to-center, active dampening, or stability control assist. Typically, in order to provide such additional performance features, a system such as a hydraulic variable effort steering system, for example, is required. However, tooling a brand new steering gear to interface with the steering system is expensive and time consuming.

Accordingly, it is desirable to provide a universal steering system that is adaptable to a plurality of existing steering gear systems.

SUMMARY OF THE INVENTION

In one aspect of the invention, a power steering assist system is provided. The system includes a housing, an actuator assembly, a rotary valve assembly, a bearing assembly, a differential pressure transducer, and a coupler. The coupler includes a first end and a free second end, the free second end extending from the housing and configured to couple to a component of a steering gear system.

In another aspect of the invention, a kit for providing steering assist to a vehicle is provided. The kit is configured to couple to a vehicle steering gear system and includes a housing, an actuator assembly, a rotary valve assembly, a bearing assembly, a differential pressure transducer, and a coupler. The coupler includes a first end and a free second end, the free second end extending from the housing and configured to couple to a component of the steering gear system.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Described herein are systems and methods for torque overlay assemblies for power steering systems. Many steering systems are incapable of performing functions such as park assist and stability control assist. However, the torque overlay assemblies described herein enable such functions by providing a magnetic actuator to apply torque independent of driver input. The torque overlay assembly includes a versatile (e.g., universal) coupler, which can connect to any style hydraulic steering gear. Thus, the torque overlay assemblies are modular in nature and can be used universally with many types of steering gear assemblies.

Figure 1:
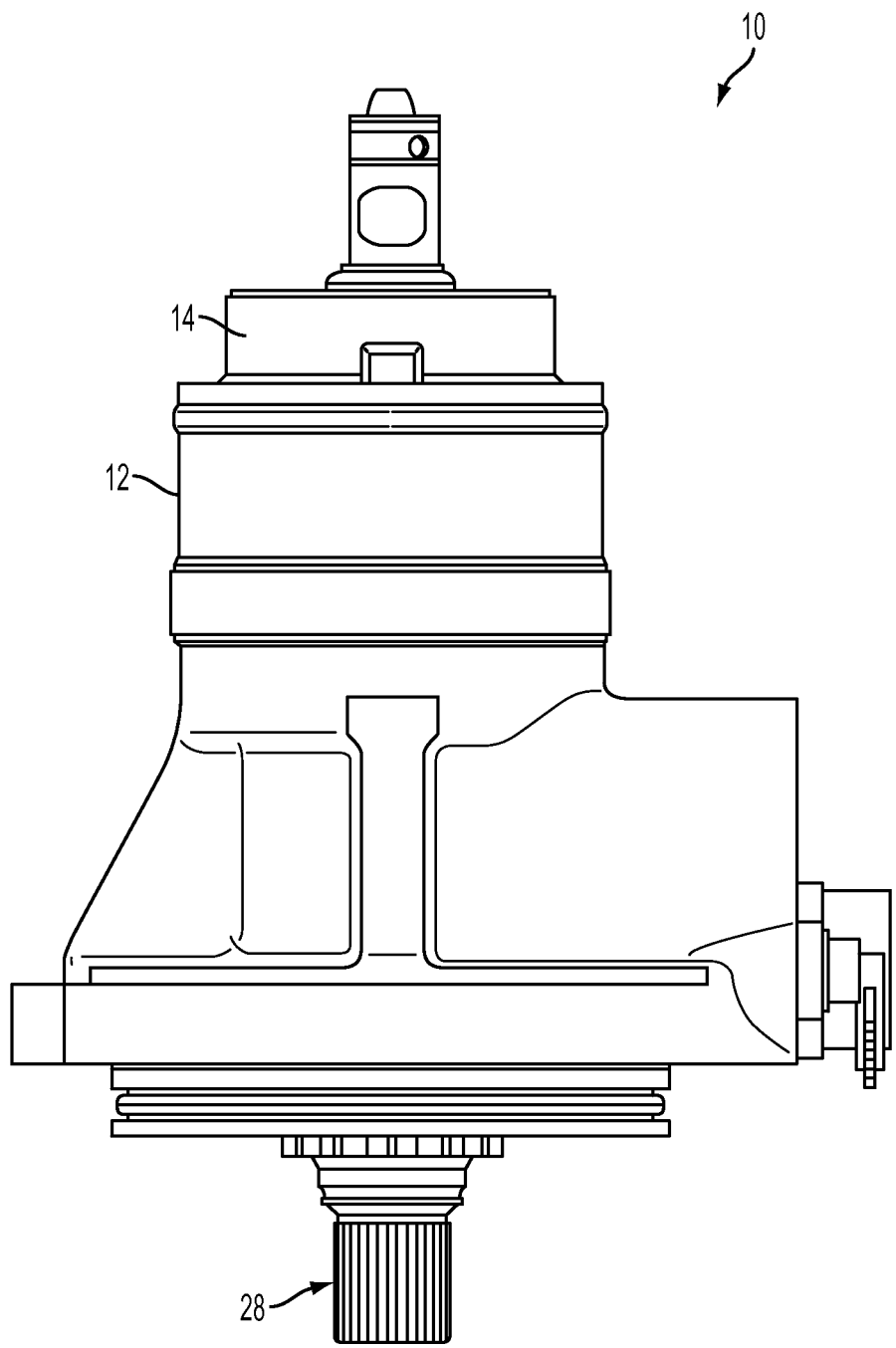
FIG. 1 is side view of an exemplary steering assist cartridge system.
Figure 2:
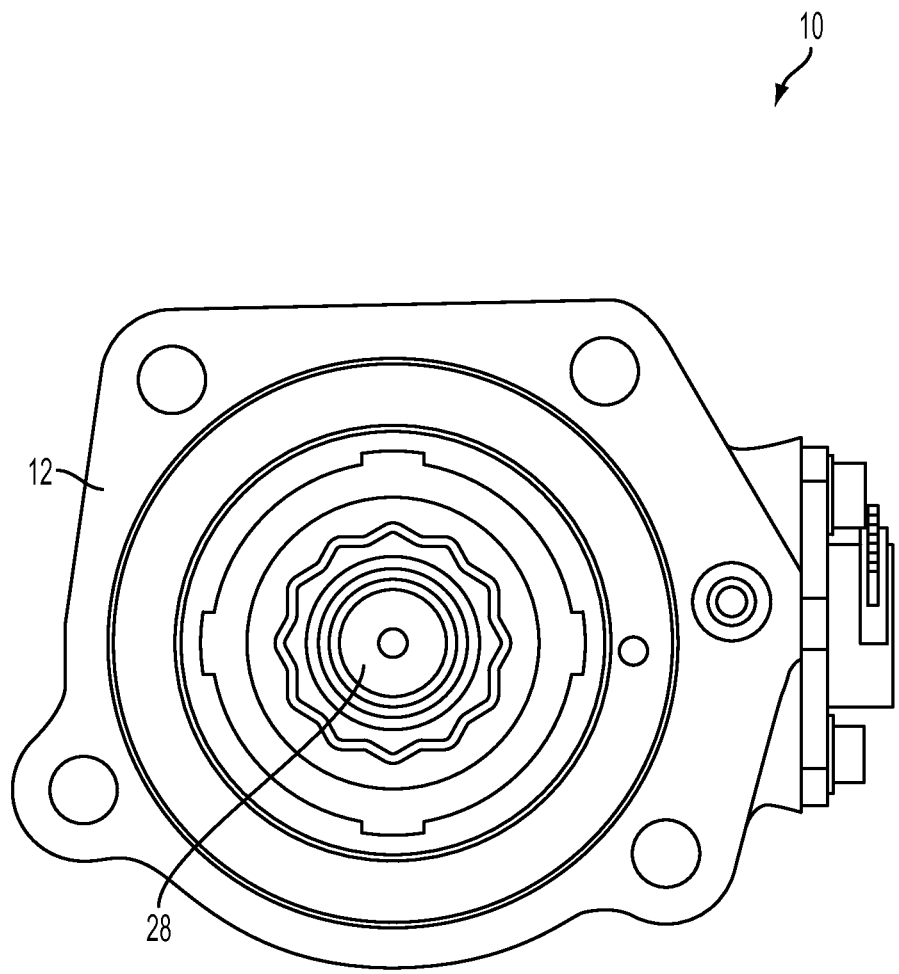
FIG. 2 is a bottom view of the system shown in FIG. 1.
Figure 3:
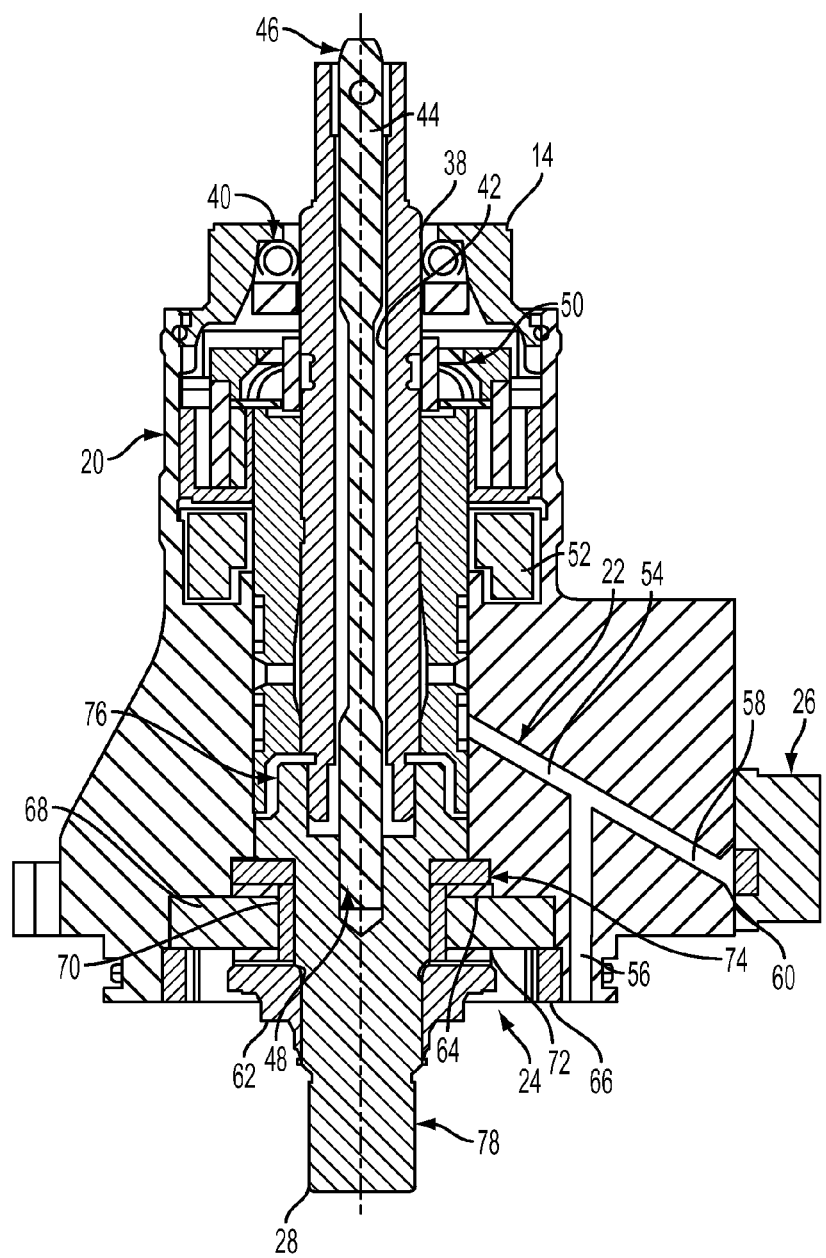
FIG. 3 is a cross-sectional view of the system shown in FIG. 1.

Referring now to the Figures, where the invention will be described with reference to specific embodiments, without limiting same, an exemplary embodiment of a modular hydraulic-assist power-steering cartridge system 10 for a vehicle is illustrated in FIGS. 1-3. System 10 generally includes a valve housing 12 and associated cover 14 that generally house a magnetic actuator assembly 20, a hydraulic rotary valve assembly 22, a bearing assembly 24, a differential pressure transmitter or transducer 26, and a universal coupler 28.

In the exemplary embodiment, system 10 includes an input shaft 38 rotatably supported by a bearing 40. Input shaft 38 includes a bore 42 to receive a torsion bar 44, a first end 46, and a second end 48. Torsion bar first end 46 is coupled to a steering wheel (not shown) of a vehicle for rotation in a conventional manner, and second end 48 is coupled to coupler 28, which is configured for coupling to an existing steering gear (not shown), as described herein in more detail. The orientation of input shaft 38 to coupler 28 is controlled, for example, with drive pins (not shown) that press into coupler 28 and mate with corresponding drive slots (not shown) formed in actuator assembly 20.

Magnetic actuator assembly 20 includes a permanent magnet ring 50, which is coupled to shaft 38, and a coil 52 to produce a magnetic flux. The magnetic flux causes ring 50 to rotate and produce a torque on shaft 38, which varies the effective centering torque of torsion bar 44 to change the level of steering assist (i.e., steering assist boost pressure), achieved for a given manual steering input applied at the steering wheel of the vehicle.

In the exemplary embodiment, hydraulic rotary valve assembly 22 is configured to provide hydraulic assistance to the steering operation of the vehicle. Hydraulic rotary valve assembly 22 includes ports 54, 56, and 58, and a seal 60.

In the exemplary embodiment, bearing assembly 24 includes a nut 62 for bearing retaining, one or more rollers 64, a spanner nut 66 for coupling to the steering gear, a bulkhead 68, and a spacer 70 to separate bearings 72 and 74 (e.g., thrust bearings). Bearing assembly 24 is configured to support rotational movement of universal coupler 28. Bearings 72, 74 and nut 62 pre-load universal coupler 28 in the axial direction (i.e., universal coupler 28 is axially loaded). However, bearing assembly 24 facilitates radial float to accommodate misalignment between universal coupler 28 and the steering gear. It is important to note bearing assembly 24 is not sized to handle the thrust loads of the steering gear such as road events (e.g., static steer or pothole impact). Bearing assembly 24 need only be sized to handle forces during assembly and hydraulic fluid internal to the assembly itself, which is minimal compared to forces on the vehicle steering gear.

In the exemplary embodiment, differential pressure transducer 26 is coupled to housing 12 proximate hydraulic rotary valve assembly 22. Differential pressure transducer 26 converts pressure into an electrical signal. One exemplary type of pressure transducer is a strain-gage based transducer, where the conversion of pressure into an electrical signal is achieved by the physical deformation of a strain gage or gages bonded into the diaphragm of the pressure transducer. The diaphragm may help protect the sensor element, such as the strain gage, from the fluid that is being measured. A strain gage is a resistive element whose resistance changes with the amount of strain placed on it. Pressure applied to the transducer may produce a deflection of the diaphragm that introduces strain to the gages, which produces an electrical resistance change proportional to the pressure.

Figure 4:
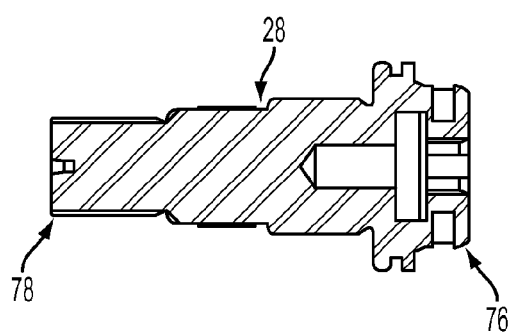
FIG. 4 is a cross-sectional view of an exemplary coupler of the system shown in FIGS. 1-3.

With reference to FIGS. 3 and 4, in the exemplary embodiment, coupler 28 includes a first end 76 coupled to torsion bar 44 and/or shaft 38, and a free second end 78 that extends out of housing 12. Coupler 28 is configured for universal application specific coupling to a steering gear of a vehicle. For example, coupler 28 may include a worm, pinion or spline for operably coupling to a steering gear (e.g., recirculating ball style steering gear, rack and pinion style steering gear, etc.). Additionally, coupler 28 may be designed to be press fit to the steering gear, or drilled and pinned to the steering gear. However, coupler 28 may include any type of coupling that enables system 10 to function as described herein. It is important to note that coupler 28 is variably designed to operably couple to an existing steering gear (not shown) such that the vehicle can be fitted or retrofitted with system 10 to provide additional features to the steering gear. As such, manufacturers do not have to tool a new steering gear to fit an existing steering system that provides such functions. The additional features may include, for example, park assist, lane keeping, lead and pull compensation, driver alert, active return-to-center, active dampening, stability control assist, or any other feature desirable to add to a vehicle. In one example, system 10 is provided as a kit configured to be operably coupled to an existing steering wheel and steering gear of a vehicle.

The hydraulically assisted power steering cartridge system described herein uses a bolt on style valve housing having a magnetic actuator assembly, hydraulic rotary valve assembly, thrust bearing assembly, and differential pressure transducer. The cartridge system may include Magnasteer torque overlay, which uses a magnetic actuator to apply torque to the hydraulic valve independent of driver input. The cartridge system is a modular assembly that uses a universal coupler that is designed or modified to connect to any style hydraulic steering gear. This includes rack and pinion and integral gear, and does so without adding additional components to the steering system that compromise steering feel, add inertia, or add friction. The universal coupler can be application specific to include a worm, pinion, spline, press fit, or drilled and pinned to connect a steering gear. The cartridge system enables vehicle level manufacturers and hydraulic steering gear manufacturers to adapt additional technology (e.g., Magnasteer torque overlay technology) to a vehicle without replacing a complete hydraulic system. Further, because the cartridge system is provided as a separate system from the steering gear, each may be independently serviced or replaced, thereby saving time and money.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A power steering assist system comprising:
a housing;
an actuator assembly;
a rotary valve assembly;
a differential pressure transducer;
a coupler comprising a first end and a free second end, the free second end that extends out of the housing and configured to couple to a steering gear of a vehicle; and
a bearing assembly disposed within the housing, the bearing assembly facilitating radial float and axial loading of the coupler, the bearing assembly including a first and second bearing configured to rotatbly support the coupler, and a nut coupled to the housing, the coupler extends through an aperture formed in the nut.

2. The system of claim 1, wherein the actuator assembly is a magnetic actuator assembly.

3. The system of claim 1, wherein the rotary valve assembly is a hydraulic rotary valve assembly.

4. The system of claim 1, further comprising:
an input shaft disposed at least partially within the housing, the input shaft having a bore, a first end configured to couple to a vehicle steering wheel, and a second end configured to couple to the coupler first end; and
a torsion bar disposed within the input shaft bore.

5. The system of claim 4, wherein the torsion bar includes a first end and a second end, wherein the first end extends into a bore formed in the coupler first end.

6. The system of claim 1, wherein the bearing assembly further includes a spanner nut coupled to the housing and disposed at least partially about the nut.

7. The system of claim 6, wherein the bearing assembly further comprises a bulkhead disposed between the first bearing and the second bearing.

8. A kit for providing steering assist to a vehicle, the kit configured to couple to a vehicle steering gear system, the kit comprising:
a housing;
an actuator assembly;
a rotary valve assembly;
a differential pressure transducer;
a coupler comprising a first end and a free second end, the free second end extending from the housing through a bulkhead and configured to couple to a component of the vehicle steering gear system; and
a bearing assembly facilitating radial float of the coupler, disposed in the housing, the bearing assembly having a first bearing spaced apart from a second bearing by a spacer that engages the first bearing and the second bearing, the second bearing configured to rotatably support the coupler, and a nut coupled to the housing, the coupler extending through an aperture formed in the nut.

9. The kit of claim 8, wherein the actuator assembly is a magnetic actuator assembly.

10. The kit of claim 8, wherein the rotary valve assembly is a hydraulic rotary valve assembly.

11. The kit of claim 8, further comprising:
   an input shaft disposed at least partially within the housing, the input shaft having a bore, a first end configured to couple to a vehicle steering wheel, and a second end configured to couple to the coupler first end; and
   a torsion bar disposed within the input shaft bore.

12. The kit of claim 11, wherein the torsion bar includes a first end and a second end, wherein the first end extends into a bore formed in the coupler first end.

13. The kit of claim 8, wherein the bearing assembly further includes a spanner nut coupled to the housing and disposed at least partially about the nut.

14. The kit of claim 13, wherein the bulkhead is disposed between the first bearing and the second bearing.

* * * * *